(12) United States Patent
Kato

(10) Patent No.: US 10,761,405 B2
(45) Date of Patent: Sep. 1, 2020

(54) IMAGE INSPECTION DEVICE AND ILLUMINATION DEVICE

(71) Applicant: OMRON Corporation, Kyoto (JP)

(72) Inventor: Yutaka Kato, Kyotanabe (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 16/188,155

(22) Filed: Nov. 12, 2018

(65) Prior Publication Data

US 2019/0243213 A1 Aug. 8, 2019

(30) Foreign Application Priority Data

Feb. 7, 2018 (JP) .................. 2018-019874

(51) Int. Cl.
| | |
|---|---|
| *H04N 5/335* | (2011.01) |
| *G03B 15/02* | (2006.01) |
| *G01N 21/84* | (2006.01) |
| *G01N 21/88* | (2006.01) |

(52) U.S. Cl.
CPC ............. *G03B 15/02* (2013.01); *G01N 21/84* (2013.01); *G01N 21/8806* (2013.01); *G01N 2021/845* (2013.01); *G01N 2021/8845* (2013.01)

(58) Field of Classification Search
CPC .......................... G01N 2021/845; G01N 21/84
See application file for complete search history.

(56) References Cited

U.S. PATENT DOCUMENTS

| | | | | |
|---|---|---|---|---|
| 4,488,679 | A * | 12/1984 | Bockholt | G06K 7/12 |
| | | | | 235/462.04 |
| 2003/0058631 | A1 | 3/2003 | Yoneda | |
| 2005/0007593 | A1 * | 1/2005 | Lebens | G01N 21/21 |
| | | | | 356/394 |
| 2011/0170293 | A1 * | 7/2011 | Murai | F21V 5/007 |
| | | | | 362/245 |
| 2018/0299386 | A1 * | 10/2018 | Masumura | G01N 21/8806 |

FOREIGN PATENT DOCUMENTS

| | | |
|---|---|---|
| EP | 1930718 | 6/2008 |
| EP | 1930719 | 6/2008 |
| JP | 2009128345 | 6/2009 |
| JP | 2014092477 | 5/2014 |
| JP | 2017062120 | 3/2017 |

OTHER PUBLICATIONS

"Search Report of Europe Counterpart Application", dated May 14, 2019, p. 1-p. 6.

* cited by examiner

*Primary Examiner* — Gary C Vieaux
(74) *Attorney, Agent, or Firm* — JCIPRNET

(57) ABSTRACT

The disclosure provides an image inspection device capable of uniformizing an irradiation solid angle of light to be radiated to each point on a target and being downsized. An image inspection device includes a photographing portion that images a target, and an illumination portion disposed between the target and the photographing portion. The illumination portion includes a surface light source, and a plurality of sets each including first to n-th optical members arranged along a light emitting surface of the surface light source. n is an integer equal to or greater than 2. The first to n-th optical members are disposed to face the light emitting surface, and transmit light emitted from the light emitting surface toward the target. Wavelengths and solid angles of light emitted from the first to n-th optical members toward the target are different from one another.

20 Claims, 11 Drawing Sheets

IMAGE INSPECTION DEVICE AND ILLUMINATION DEVICE

CROSS-REFERENCE TO RELATED APPLICATION

This application claims the priority benefit of Japanese application serial no. 2018-019874, filed on Feb. 7, 2018. The entirety of the above-mentioned patent application is hereby incorporated by reference herein and made a part of this specification.

BACKGROUND

Technical Field

The present technology relates to an image inspection device and an illumination device that inspect a target using a captured image.

Description of Related Art

In the field of factory automation (FA) and the like, imaging a target while illuminating the target and inspecting an appearance of the target using an obtained captured image is known.

For example, Japanese Laid-Open No. 2017-62120 (Patent Document 1) discloses an inspection system that uses an illumination device including a surface light source, and a lens, a light shielding mask, and a filter disposed between the surface light source and an inspection target. In this system, an irradiation solid angle of inspection light radiated to each point on the inspection target is formed to be substantially uniform by the lens, the light shielding mask, and the filter. Accordingly, an entire field of view can be uniformly irradiated, and inspection accuracy for the target is improved. Further, Patent Document 1 also discloses a technology of changing a color of observation light according to an inclination angle of the inspection target by making solid angles of blue light, green light, and red light different from one another.

Patent Documents

[Patent Document 1] Japanese Laid-Open No. 2017-62120

In the illumination device of the related art, the lens disposed between the surface light source and the inspection target needs to have a size larger than a field of view of a photographing device in order to constitute a telecentric optical system. Therefore, the illumination device is inevitably large.

SUMMARY

The disclosure provides an image inspection device and an illumination device capable of uniformizing an irradiation solid angle of light to be radiated to each point on a target and being downsized.

According to an example of the present disclosure, there is provided an image inspection device for inspecting a target using a captured image. The image inspection device includes a photographing portion that images the target; and an illumination portion disposed between the target and the photographing portion. The illumination portion includes a surface light source, and a plurality of sets each including first to n-th optical members arranged along a light emitting surface of the surface light source. n is an integer equal to or greater than 2. The first to n-th optical members are disposed to face the light emitting surface, and transmit light emitted from the light emitting surface toward the target. Wavelengths and solid angles of light emitted from the first to n-th optical members toward the target are different from one another.

According to an example of the present disclosure, there is provided an illumination device including the illumination portion included in the image inspection device provided in the above-described disclosure.

DESCRIPTION OF THE EMBODIMENTS

Figure 1:
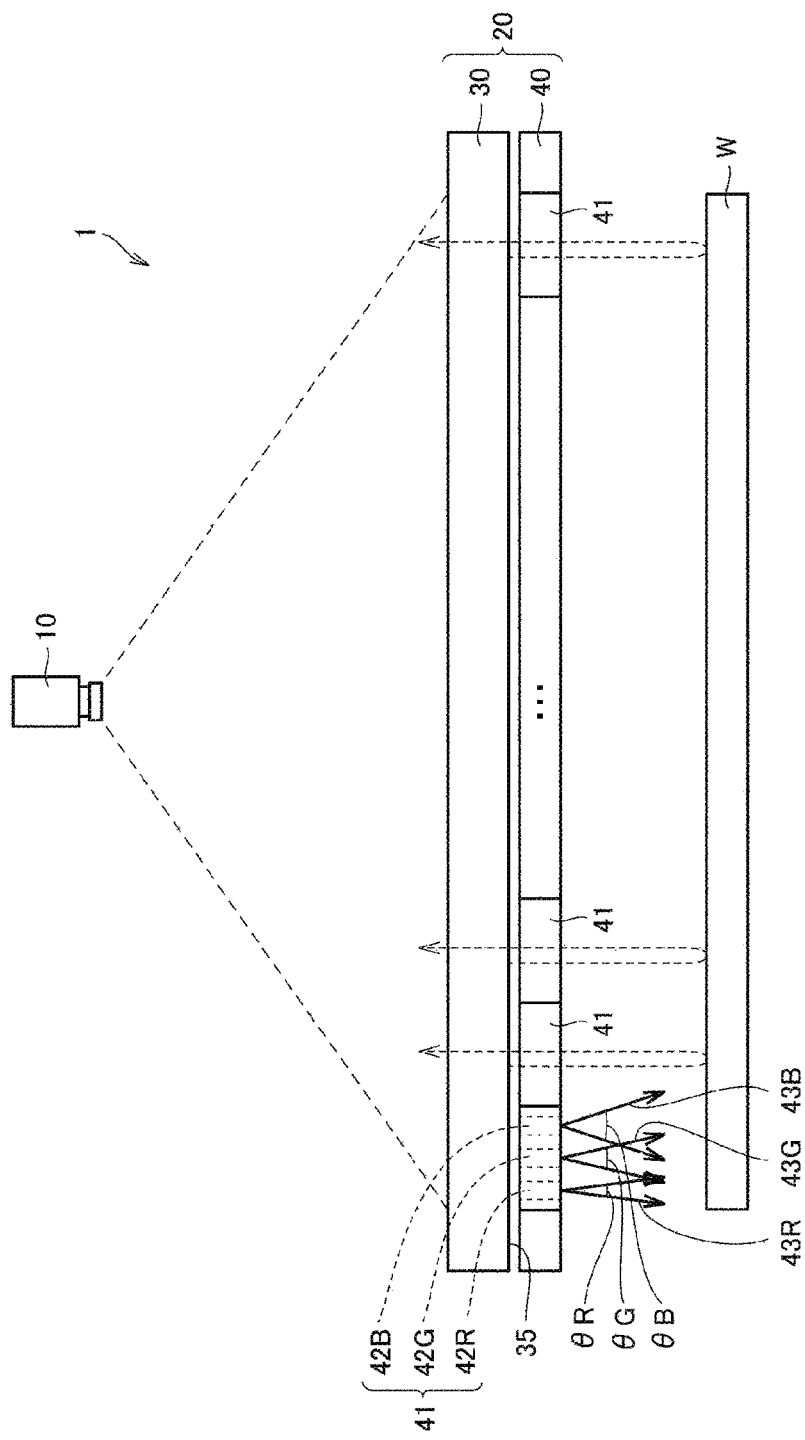
FIG. 1 is a schematic diagram illustrating an overview of an image inspection device according to an embodiment.

Embodiments of the disclosure will be described in detail with reference to the drawings. It should be noted that in the drawings, the same or corresponding parts are denoted by the same reference numerals, and description thereof will not be repeated.

<A. Application Example>

First, an example of a situation to which the disclosure is applied will be described with reference to FIG. 1. FIG. 1 is a schematic diagram illustrating an overview of an image inspection device 1 according to the embodiment.

The image inspection device 1 according to the embodiment is applied to a device that images a target (hereinafter also referred to as "workpiece W") while illuminating the workpiece W and performs appearance inspection (inspection for scratches, dirt, foreign matter, or the like) of the workpiece W using an obtained captured image in a production line or the like for an industrial product. The image inspection device 1 detects light reflected by the workpiece W and performs inspection. Therefore, a workpiece that reflects light of a liquid crystal display or the like is applied as the workpiece W.

As illustrated in FIG. 1, the image inspection device 1 includes a camera 10 which is an example of a photographing portion, and an illumination device 20 which is an example of an illumination portion.

The camera 10 images a subject present in a field of view of imaging and generates image data. The camera 10 images the workpiece W which is an appearance inspection target as a subject through the illumination device 20. It is assumed that the camera 10 in the embodiment adopts a telecentric lens. Accordingly, a line of sight of the camera 10 is parallel to an optical axis of the camera 10 at any position on the workpiece W.

The illumination device 20 illuminates a surface of the workpiece W each time the camera 10 images the workpiece W. The illumination device 20 is disposed between the workpiece W and the camera 10, radiates light toward the workpiece W, and has light transmitting properties. Therefore, the light radiated from the illumination device 20 is reflected by the workpiece W, is transmitted through the illumination device 20, and reaches the camera 10. The illumination device 20 includes a surface light source 30 and a holder 40.

The surface light source 30 radiates light toward the workpiece W from a light emitting surface 35 on the workpiece W side. The light is radiated from a plurality of light emitting regions arranged, for example, in a matrix form on the light emitting surface 35 of the surface light source 30. Reflected light from the workpiece W is transmitted through the light transmitting region other than the light emitting regions in the surface light source 30. The surface light source 30 is a member configured using, for example, an organic electroluminescence (hereinafter referred to as organic EL), a light emitting diode (LED), or the like.

The holder 40 is disposed to face the light emitting surface 35 of the surface light source 30. The holder 40 supports a plurality of sets 41 including optical members 42R, 42G, and 42B that transmit the light emitted from the light emitting surface 35 toward the workpiece W. The plurality of sets 41 are arranged, for example, in a matrix form along the light emitting surface 35. A size of each of the plurality of sets 41 is set to be equal to or smaller than a size of a region of the workpiece W indicated by one pixel in the captured image of the workpiece W from the camera 10.

The optical members 42R, 42G, and 42B included in each of the plurality of sets 41 are disposed to face the light emitting regions of the surface light source 30. In the optical members 42R, 42G, and 42B, wavelengths and solid angles of light emitted toward the workpiece W are different. For example, emitted light 43R, 43G, and 43B from the optical members 42R, 42G, and 42B have wavelengths corresponding to a red color, a green color, and a blue color, respectively. Further, a solid angle $\theta R$ of the emitted light 43R from the optical member 42R, a solid angle $\theta G$ of the emitted light 43G from the optical member 42G, and a solid angle $\theta B$ of the emitted light 43B from the optical member 42B satisfy, for example, $\theta R < \theta G < \theta B$.

Figure 2:
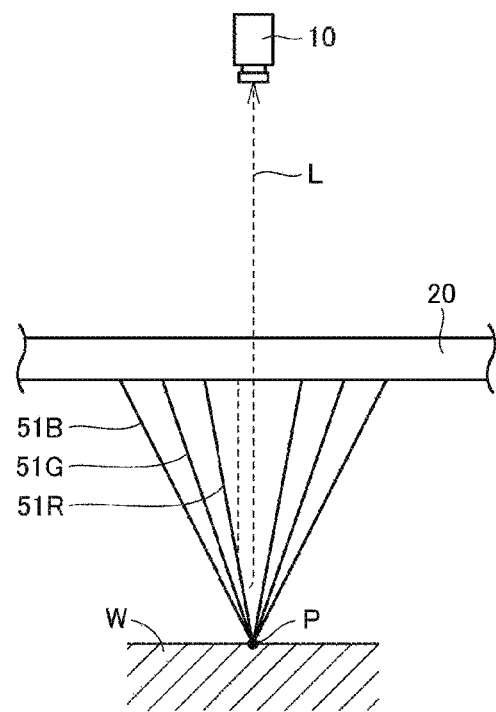
FIG. 2 is a diagram illustrating a solid angle of irradiation light at a point on a workpiece.

FIG. 2 is a diagram illustrating a solid angle of irradiation light at a point P on the workpiece W. Since the solid angles of the light emitted from the optical members 42R, 42G, and 42B are different, solid angles of the irradiation light from the optical members 42R, 42G, and 42B at the point P also is different. Specifically, the solid angle of the irradiation light 51R from the optical member 42R at the point P is the same as the solid angle $\theta R$ (see FIG. 1) of the emitted light 43R from the optical member 42R. The solid angle of the irradiation light 51G from the optical member 42G at the point P is the same as the solid angle $\theta G$ of the emitted light 43G from the optical member 42G. The solid angle of the irradiation light 51B from the optical member 42B at the point P is the same as the solid angle $\theta B$ of the emitted light 43B from the optical member 42B. When $\theta R < \theta G < \theta B$ is satisfied, the solid angle of the irradiation light 51B is greater than the solid angle of the irradiation light 51G, and the solid angle of the irradiation light 51G is greater than the solid angle of the irradiation light 51R, as illustrated in FIG. 2.

As illustrated in FIG. 2, when the surface of the workpiece W is perpendicular to the optical axis of the camera 10, light L reflected at the point P and incident on the camera 10 (hereinafter referred to as "incident light") includes all of the irradiation light 51R, 51G, and 51B. When the irradiation light 51R, 51G, and 51B has wavelengths corresponding to red, green, and blue, respectively, the incident light L from the point P to the camera 10 is white light that is a combination of red light, green light, and blue light. Therefore, a pixel corresponding to the point P in the captured image indicates a white color.

Figure 3:
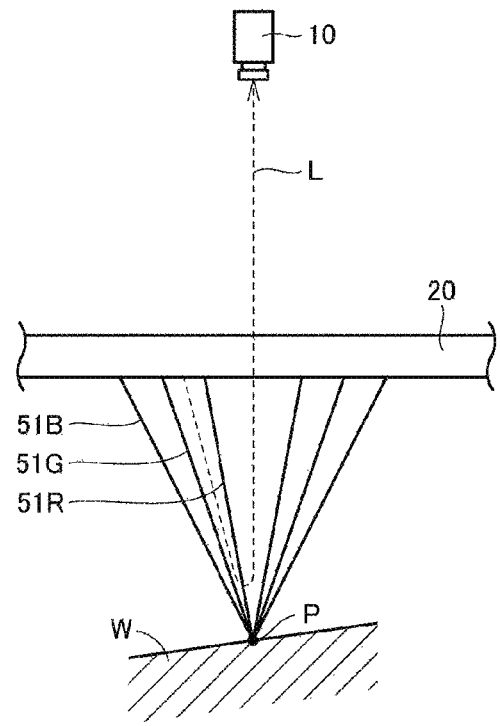
FIG. 3 is a diagram illustrating light incident on a camera when a surface of the workpiece is slightly inclined.

FIG. 3 is a diagram illustrating light that is incident on the camera 10 when the surface of the workpiece W is slightly inclined. In the example illustrated in FIG. 3, the incident light L from the point P to the camera 10 includes the irradiation light 51G and 51B. When the irradiation light 51G and 51B has wavelengths corresponding to green and blue, respectively, the incident light L is light that is a combination of green and blue. Therefore, the pixel corresponding to the point P in the captured image indicates a color that is a combination of green and blue colors.

Figure 4:
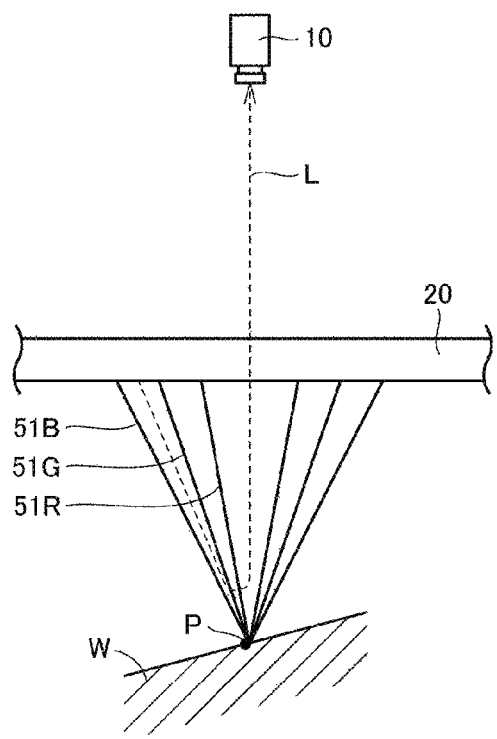
FIG. 4 is a diagram illustrating light incident on the camera when the surface of the workpiece W is further inclined.

FIG. 4 is a diagram illustrating light that is incident on the camera 10 when the surface of the workpiece W is further inclined. In the example illustrated in FIG. 4, the incident light L from the point P to the camera 10 includes only the irradiation light 51B. When the irradiation light 51B has a wavelength corresponding to blue, the incident light L is blue light. Therefore, the pixel corresponding to the point P in the captured image indicates blue.

When the surface of the workpiece W is further inclined as compared with FIG. 4, none of the irradiation light 51R, 51G, and 51B is reflected at the point P and incident on the camera 10. Therefore, the pixel corresponding to the point P in the captured image indicates black.

Thus, it is possible to ascertain a degree of inclination of a local surface of the workpiece W by confirming the color of the captured image.

Figure 5:
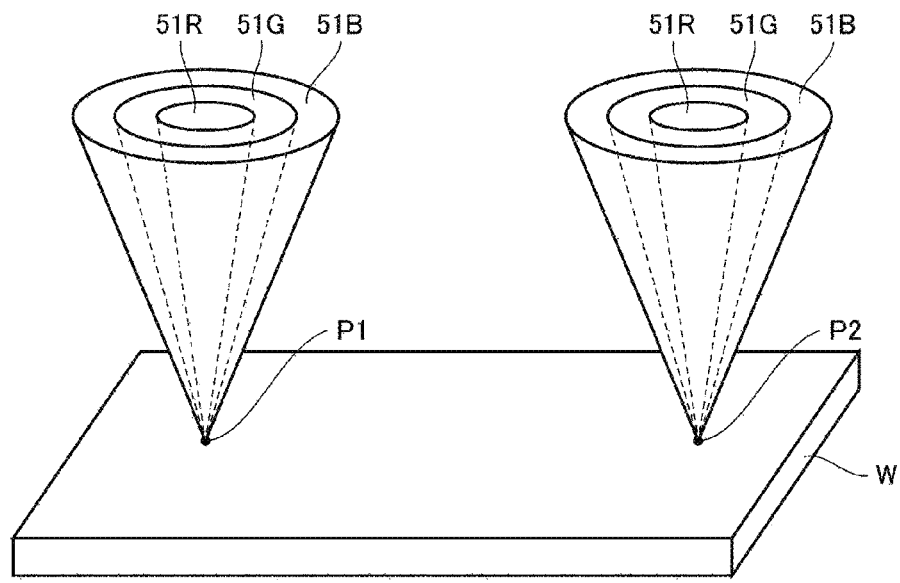
FIG. 5 is a diagram illustrating solid angles of irradiation light at any two points on the workpiece W.

FIG. 5 is a diagram illustrating solid angles of the irradiation light 51R, 51G, and 51B at any two points P1 and P2 on the workpiece W. Since the plurality of sets 41 each including the optical members 41R, 41G, and 41B are repeatedly arranged along the light emitting surface 35 of the surface light source 30, solid angles of the irradiation light 51R, 51G, and 51B at any two points P1 and P2 on the workpiece W are substantially the same. That is, the solid angles of the light radiated to respective points on the workpiece W are uniformized, and the camera 10 can image the respective points on the workpiece W under the same irradiation conditions. Accordingly, it is possible to accurately inspect a surface state of the entire workpiece W in an imaging range based on the captured image.

Further, a size of the set 41 including the optical members 42R, 42G, and 42B is set to be equal to or smaller than a size of a region of the workpiece W indicated by one pixel in the captured image of the workpiece W from the camera 10. Therefore, a size of the holder 40 supporting the plurality of sets 41 each including the optical members 42R, 42G, and 42B may be substantially the same as the field of view of the camera 10 (for example, may be the size of the workpiece W). As a result, it is unnecessary to have a telecentric optical system having a size larger than the field of view of the photographing device unlike in the related art, and it is possible to downsize the illumination device 20 and the image inspection device 1.

Accordingly, it is possible to uniformize the solid angles of the light to be radiated to respective points on the workpiece W and to realize the image inspection device 1 that can be downsized.

<B. Example of Production Line to which Image Inspection Device is Applied>

Figure 6:
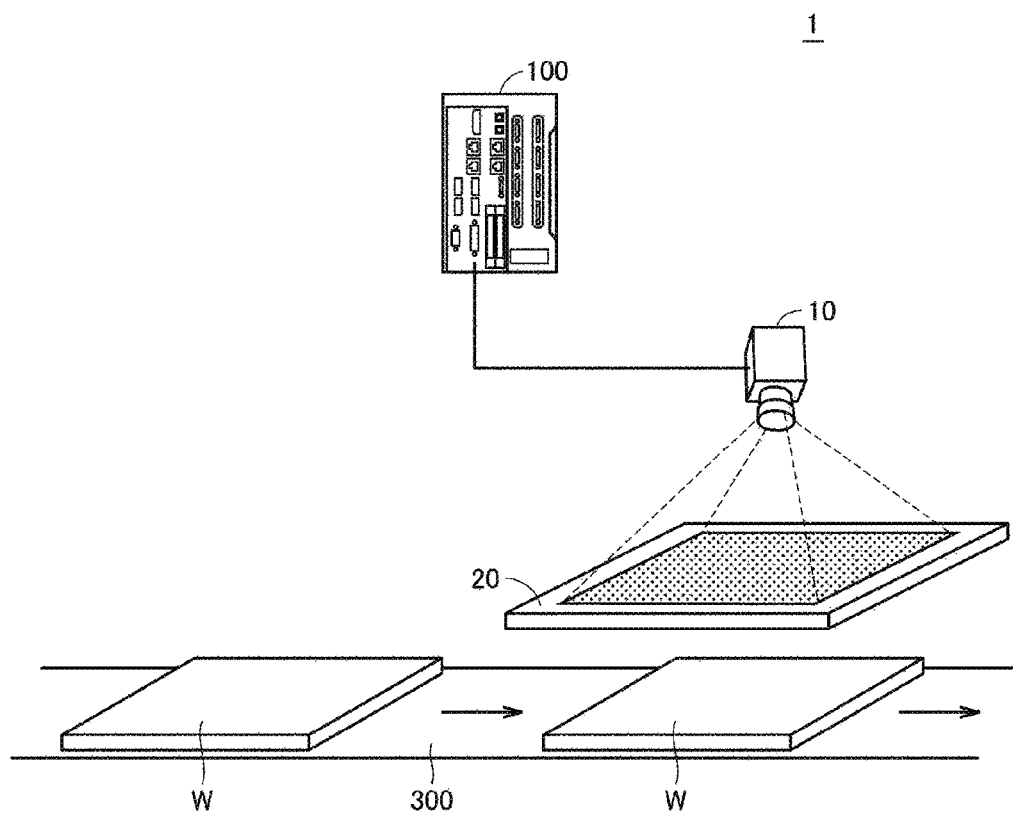
FIG. 6 is a schematic diagram illustrating an example of a production line to which the image inspection device according to the embodiment is applied.

Next, an example of a production line to which the image inspection device 1 is applied will be described with reference to FIG. 6. FIG. 6 is a schematic diagram illustrating the example of a production line to which the image inspection device 1 according to the embodiment is applied.

As illustrated in FIG. 6, the image inspection device 1 according to the embodiment includes a camera 10 that images workpieces W that are continuously carried in, an illumination device 20 that illuminates the workpiece W, and a control device 100 that controls the illumination device 20 and the camera 10. The camera 10 mainly includes an optical system such as a lens and an aperture, and a light receiving element such as a charge coupled device (CCD) image sensor or a complementary metal oxide semiconductor (CMOS) image sensor. In a production line for industrial products or the like, the image inspection device 1 is a device that images the workpiece W with the camera 10 while illuminating the workpiece W with the illumination device 20 and performs appearance inspection of the workpiece W using an obtained captured image under the control of the control device 100.

Specifically, the workpiece W that is an inspection target moves to an inspection position at which the camera 10 and the illumination device 20 are fixed, by a movable stage 300. When the workpiece W moves to the inspection position, the workpiece W stops at the position until the appearance inspection of the image inspection device 1 ends. In this case, the control device 100 images the workpiece W with the camera 10 while illuminating the workpiece W with the illumination device 20, and displays a captured image on a monitor. Accordingly, a worker inspects the appearance of the workpiece W while viewing colors of the captured image displayed on a monitor screen. Alternatively, the control device 100 may perform predetermined image processing on the captured image and determine whether or not the workpiece W is abnormal on the basis of a result of the image processing.

The control device 100 includes, for example, a processor such as a central processing unit (CPU) or a micro-processing unit (MPU), a random access memory (RAM), a display controller, a system controller, an input/output (I/O) controller, a hard disk, a camera interface, an input interface, a light emitting interface, a communication interface, and a memory card interface. These parts are connected to each other around the system controller so that the units can perform data communication with each other.

<C. Example of Configuration of Illumination Device>

Figure 7:
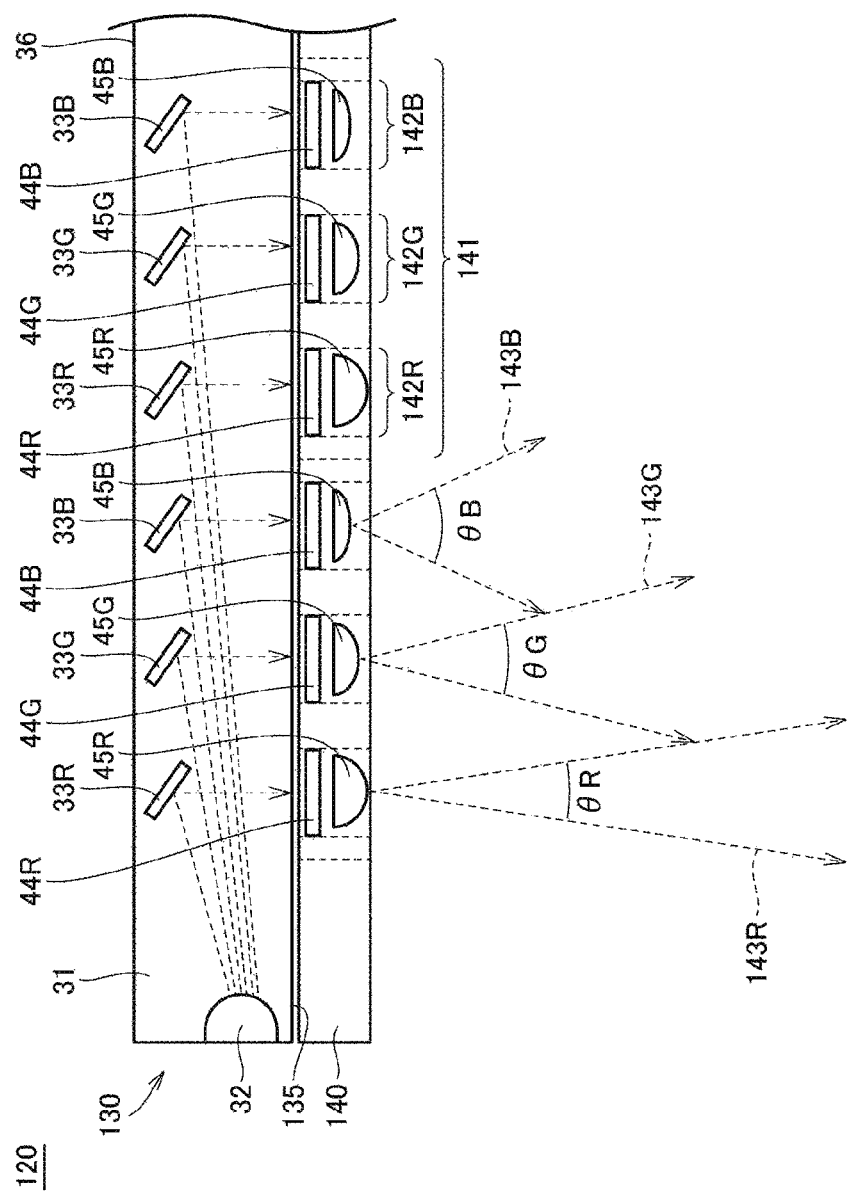
FIG. 7 is a schematic diagram illustrating a cross-section of an example of an illumination device according to the embodiment.
Figure 8:
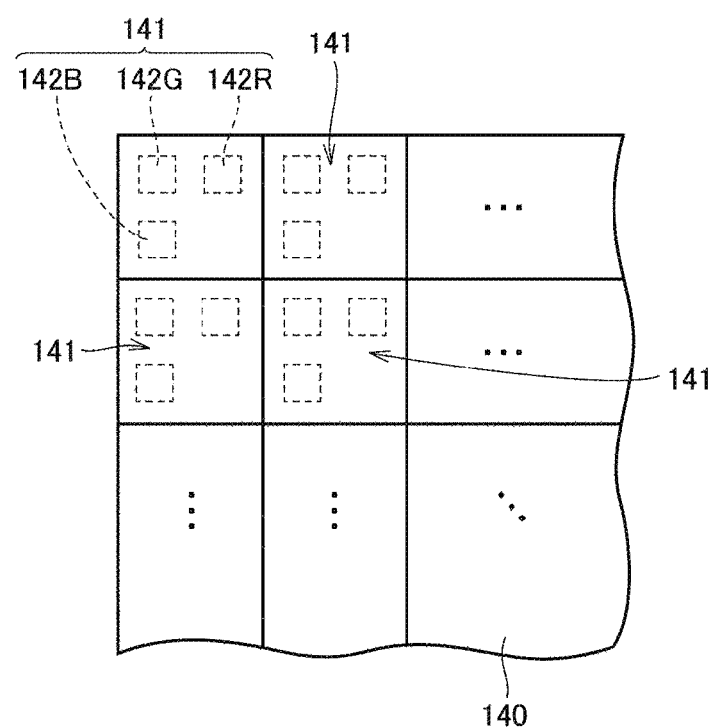
FIG. 8 is a schematic diagram illustrating an upper surface of a holder included in the illumination device illustrated in FIG. 7.

An example of the configuration of the illumination device according to the embodiment will be described with reference to FIGS. 7 and 8. FIG. 7 is a schematic diagram illustrating a cross-section of an example of the illumination device according to the embodiment. FIG. 8 is a schematic diagram illustrating an upper surface of a holder included in the illumination device illustrated in FIG. 7.

The illumination device 120 is a light transmission type sheet illumination device that is an example of the illumination device 20 illustrated in FIG. 1, and includes a surface light source 130 and a holder 140, as illustrated in FIG. 7.

The surface light source 130 is an example of the surface light source 30 illustrated in FIG. 1, and radiates white light from a light emitting surface 135. The surface light source 130 includes a light guide plate 31, a plurality of LEDs 32 disposed around the light guide plate 31, and a plurality of reflective plates 33R, 33G, and 33B present inside the light guide plate 31.

The light guide plate 31 is a flat plate-shaped member that receives light introduced thereinto from the plurality of LEDs 32 disposed around the light guide plate 31, moves the introduced light while diffusing the light therein, and radiates the light from the light emitting surface 135, to guide the light from the plurality of LEDs 32 to the workpiece W. The shape of the light guide plate 31 in the example illustrated in FIG. 7 is rectangular in plan view. For the light guide plate 31, a member such as acrylic having excellent light guiding properties is applied.

The plurality of LEDs 32 emit white light. The plurality of LEDs 32 are disposed along the side of the flat plate-shaped light guide plate 31.

The reflective plates 33R, 33G, and 33B are flat plate-shaped members present inside the light guiding plate 31. Shapes and positions of the reflective plates 33R, 33G, and 33B are designed so that the reflective plates 33R, 33G, and 33B reflect the light from the LED 32 to guide the light from the LED 32 to the light emitting surface 135. The reflective plates 33R, 33G, and 33B are disposed to overlap with the respective optical members 142R, 142G, and 142B supported by the holder 140 when viewed in an optical axis direction of the camera 10. Further, the reflective plates 33R, 33G, and 33B are disposed to be inclined at an inclination angle for reflecting the light from the LED 32 to the optical members 142R, 142G, and 142B.

Accordingly, the light reflected by the reflective plates 33R, 33G, and 33B is radiated from the light emitting surface 135 and guided to the workpiece W. That is, a region in which the reflective plates 33R, 33G, and 33B are disposed is a light emitting region. In a region (light transmitting region) in which the reflective plates 33R, 33G, and 33B are not disposed, the light reflected by the workpiece W is transmitted and emitted from a surface 36 opposite to the light emitting surface 35.

The holder 140 is an example of the holder 40 illustrated in FIG. 1. As illustrated in FIG. 8, the holder 140 is a transparent member that supports a plurality of sets 141 each including the optical members 142R, 142G, and 142B. The plurality of sets 141 are arranged in a matrix form along the light emitting surface 135 of the surface light source 130. A size of the set 141 including the optical members 142R, 142G, and 142B may be equal to or smaller than a size of a region of the workpiece W indicated by one pixel in the captured image of the workpiece W from the camera 10. As described above, the reflective plates 33R, 33G, and 33B are disposed to overlap the optical members 142R, 142G, and 142B, respectively. Therefore, the same number of reflective plates 33R as the number of sets 141 supported by the holder 140 are disposed in the light guide plate 31. Similarly, the same number of reflective plates 33G and reflective plates 33B as the sets 141 supported by the holder 140 are disposed in the light guide plate 31.

As illustrated in FIG. 7, the optical member 142R includes a filter 44R and a lens 45R. The optical member 142G includes a filter 44G and a lens 45G. The optical member 142B includes a filter 44B and a lens 45B.

The filters 44R, 44G, and 44B transmit light having different wavelengths. Specifically, the filter 44R is a filter that transmits light having a wavelength corresponding to red. Therefore, in the white light radiated from the light emitting surface 35 of the surface light source 130, light other than the red light is absorbed by the filter 44R and the red light is transmitted through the filter 44R. The filter 44G is a filter that transmits light having a wavelength corresponding to green. Therefore, in the white light radiated from the light emitting surface 35 of the surface light source 130, light other than the green light is absorbed by the filter 44G and the green light is transmitted through the filter 44G. The filter 44B is a filter that transmits light having a wavelength corresponding to blue. Therefore, in the white light radiated from the light emitting surface 35 of the surface light source 130, light other than the blue light is absorbed by the filter 44B and the blue light is transmitted through the filter 44B.

The lenses 45R, 45G, and 45B are convex lenses having different focal lengths. Since the lenses 45R, 45G, and 45B have different thicknesses and surface curvatures, the focal lengths of the lenses 45R, 45G, and 45B are different from one another. In the example illustrated in FIG. 7, the focal lengths of the lenses 45R, 45G, and 45B are set so that a solid angle θR of emitted light 143R from the lens 45R, a solid angle θG of emitted light 143G from the lens 45G, and a solid angle θB of emitted light 143B from the lens 45B satisfy θR<θG<θB. Accordingly, it is possible to make the solid angles of the emitted light 143R, 143G, and 143B from the lenses 45R, 45G, and 45B different from one another.

<D. Operation and Effects>

As described above, the image inspection device includes the camera 10 that images the workpiece W, and the illumination device 120 arranged between the workpiece W and the camera 10. The illumination device 120 includes the surface light source 130 and the plurality of sets 141 each including the optical members 142R, 142G, and 142B arranged along the light emitting surface 135 of the surface light source 130. The optical members 142R, 142G, and 142B are disposed to face the light emitting surface 135, and transmit the light emitted from the light emitting surface 135 toward the workpiece WI. Wavelengths and solid angles of the emitted light 143R, 143G, and 143B directed from the optical members 142R, 142G, and 142B to the workpiece W are different from one another.

Since the wavelengths and the solid angles of the emitted light 143R, 143G, and 143B from the optical members 142R, 142G, and 142B are different from one another, light reflected from the workpiece W and incident on the camera 10 has a wavelength according to a degree of inclination of the surface of the workpiece W. Therefore, it is possible to ascertain a degree of inclination of a local surface of the workpiece W by confirming the colors of the captured image.

Further, since the plurality of sets 141 each including optical members 141R, 141G, and 141B are repeatedly arranged along the light emitting surface 135 of the surface light source 30, the solid angles of the light radiated to respective points on the surface of the workpiece W are substantially the same (see FIG. 5). Therefore, the camera 10 can image the respective points on the workpiece W under the same irradiation conditions. Accordingly, it is possible to accurately inspect a surface state of the entire workpiece W in the imaging range based on the captured image.

Further, a size of the set 141 including the optical members 142R, 142G, and 142B may be equal to or smaller than a size of a region of the workpiece W indicated by one pixel in the captured image of the workpiece W from the camera 10. Therefore, the size of the holder 140 supporting the plurality of sets 141 may be substantially the same as the field of view of the camera 10. As a result, it is unnecessary to have a telecentric optical system having a size larger than the field of view of the photographing device unlike in the related art, and it is possible to downsize the illumination device 120 and the image inspection device 1.

Accordingly, it is possible to uniformize the solid angles of the light to be radiated to respective points on the workpiece W and to realize the image inspection device 1 that can be downsized.

The surface light source 130 emits white light. The optical members 142R, 142G, and 142B includes the filters 44R, 44G, and 44B transmitting light having different wavelengths, respectively. Accordingly, it is possible to make wavelengths of the emitted light 143R, 143G, and 143B from the optical members 142R, 142G, and 142B different from one another.

The optical members 142R, 142G, and 142B include the lenses 45R, 45G, and 45B having different focal lengths, respectively. Accordingly, it is possible to make the solid angles of the emitted light 143R, 143G, and 143B from the optical members 142R, 142G, and 142B different from one another.

The emitted light 143R, 143G, and 143B from the optical members 142R, 142G, and 142B are red light, green light, and blue light, respectively. Accordingly, in the captured image of the workpiece W, a place having a surface orthogonal to the optical axis of the camera 10 indicates a white color. A place having a slightly inclined surface indicates a color that is a combination of colors of two emitted light beams having a large solid angle among the emitted light 143R, 143G, and 143B. A place having a further inclined surface indicates a color of the emitted light having the largest solid angle among the emitted light 143R, 143G, and 143B. Further, a place having a further inclined surface indicates a black color. Thus, the color of the captured image changes according to a degree of inclination of the surface of the workpiece W. Accordingly, it is possible to ascertain a degree of local inclination of the surface of the workpiece W by confirming the colors of the captured image.

<E. Modification Example 1 of Configuration of Illumination Device>

Figure 9:
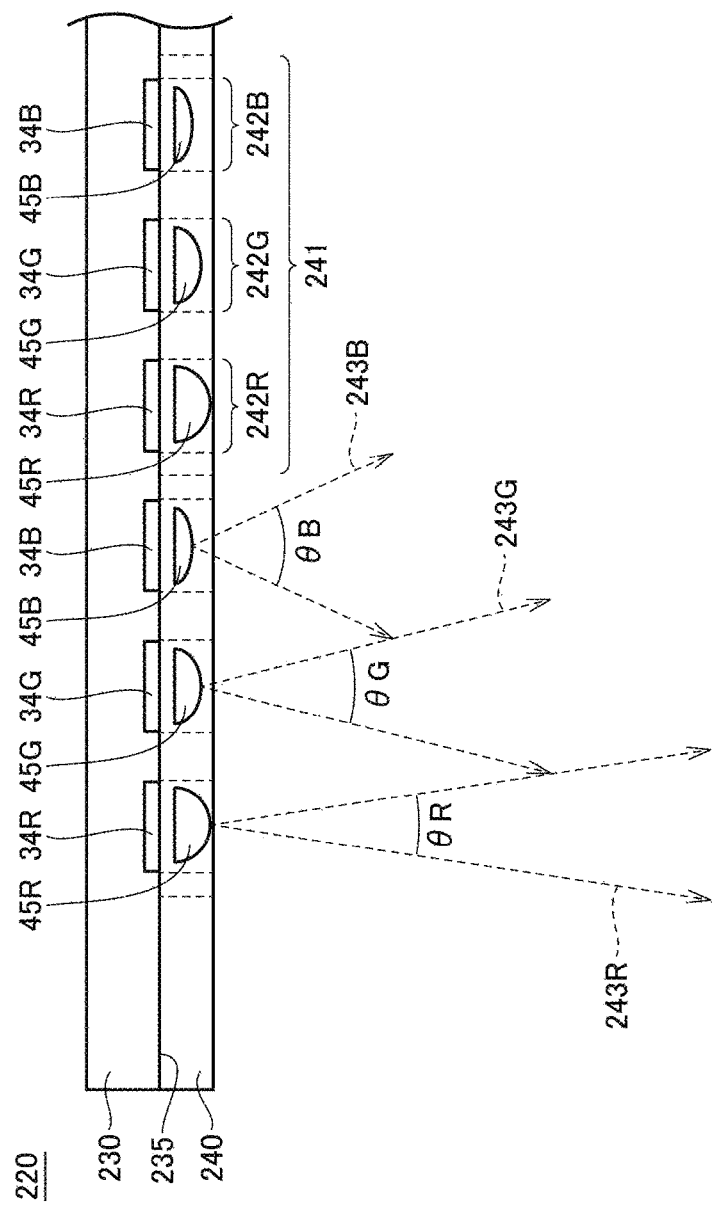
FIG. 9 is a schematic diagram illustrating a cross-section of an illumination device according to modification example 1.
Figure 10:
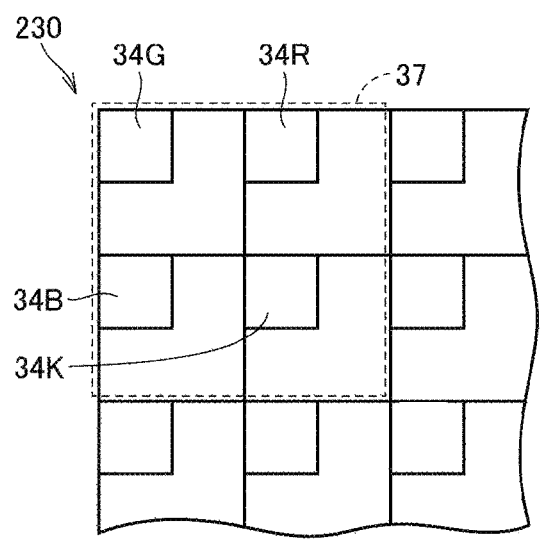
FIG. 10 is a schematic diagram illustrating an upper surface of a surface light source included in the illumination device illustrated in FIG. 9.

The configuration of the illumination device is not limited to the configuration illustrated in FIG. 7. The configuration of the illumination device 220 according to modification example 1 will be described with reference to FIGS. 9 and 10. FIG. 9 is a schematic diagram illustrating a cross-section of the illumination device 220 according to modification example 1. FIG. 10 is a schematic diagram illustrating a top surface of a surface light source 230 included in an illumination device 220 illustrated in FIG. 9.

The illumination device 220 is different from the illumination device 120 illustrated in FIG. 7 in that the illumination device 220 includes a surface light source 230 in place of the surface light source 130 and a holder 240 in place of the holder 140.

The surface light source 230 is a light source using an organic EL. As illustrated in FIG. 10, the surface light source 230 includes a plurality of sets 37 each including light emitting portions 34R, 34G, 34B, and 34K. The plurality of sets 37 are arranged in a matrix form along a light emitting surface 235. A size of the set 37 is set to be equal to or smaller than a size of a region of the workpiece W indicated by one pixel in the captured image of the workpiece W from the camera 10.

Each of the light emitting portions 34R, 34G, 34B, and 34K includes a pair of electrodes facing each other. When a voltage is applied between the electrodes in the pair, the light emitting portions 34R, 34G, 34B, and 34K emit light. However, in the surface light source 230, only the light emitting portions 34R, 34G, and 34B are used as light emitting regions, no voltage is applied between the electrodes in the pair of the light emitting portion 34K, and the light emitting portion 34K is not used as a light emitting region.

A light emitting layer emitting red light is disposed between the electrodes in the pair in the light emitting portion 34R. Therefore, the light emitting portion 34R emits red light. A light emitting layer emitting green light is disposed between the electrodes in the pair in the light emitting portion 34G. Therefore, the light emitting portion 34G emits green light. A light emitting layer emitting blue light is disposed between the electrodes in the pair in the light emitting portion 34B. Therefore, the light emitting portion 34B emits blue light. Thus, wavelengths of light radiated from the light emitting portions 34R, 34G, and 34B are different from one another.

The holder 240 is a transparent member that supports a plurality of sets 241 each including optical members 242R, 242G, and 242B. The plurality of sets 241 are arranged in a matrix form along the light emitting surface 235 of the surface light source 230. The optical members 242R, 242G, and 242B are disposed to face the light emitting portions 34R, 34G, and 34B, respectively. That is, the optical members 242R, 242G, and 242B are disposed to overlap the light emitting portions 34R, 34G, and 34B when viewed in an optical axis direction of the camera 10. Since the wavelengths of light radiated from the light emitting portions 34R, 34G, and 34B are different from one another as described above, wavelengths of the emitted light 243R, 243G, and 243B from the optical members 242R, 242G, and 242B are also different from one another.

The optical members 242R, 242G, and 242B include the lenses 45R, 45G, and 45B having different focal lengths, respectively. Accordingly, solid angles of emitted light 243R, 243G, and 243B from the optical members 242R, 242G, and 242B are also different from one another, similar to the optical members 142R, 142G, and 142B illustrated in FIG. 7. In the example illustrated in FIG. 9, the focal lengths of the lenses 45R, 45G, and 45B are set so that a solid angle θR of the emitted light 243R from the lens 45R, a solid angle θG of the emitted light 243G from the lens 45G, and a solid angle θB of the emitted light 243B from the lens 45B satisfy θR<θG<θB.

According to the illumination device 220 according to this modification example, the surface light source 230 includes the light emitting portions 34R, 34G, and 34B that radiate light having different wavelengths. The light emitting portions 34R, 34G, 34B are arranged to face the optical members 242R, 242G, and 242B, respectively. Accordingly, it is possible to make wavelengths and solid angles of the emitted light 243R, 243G, 243B from the optical members 242R, 242G, and 242B different from one another.

<F. Modification Example 2 of Configuration of Illumination Device>

Figure 11:
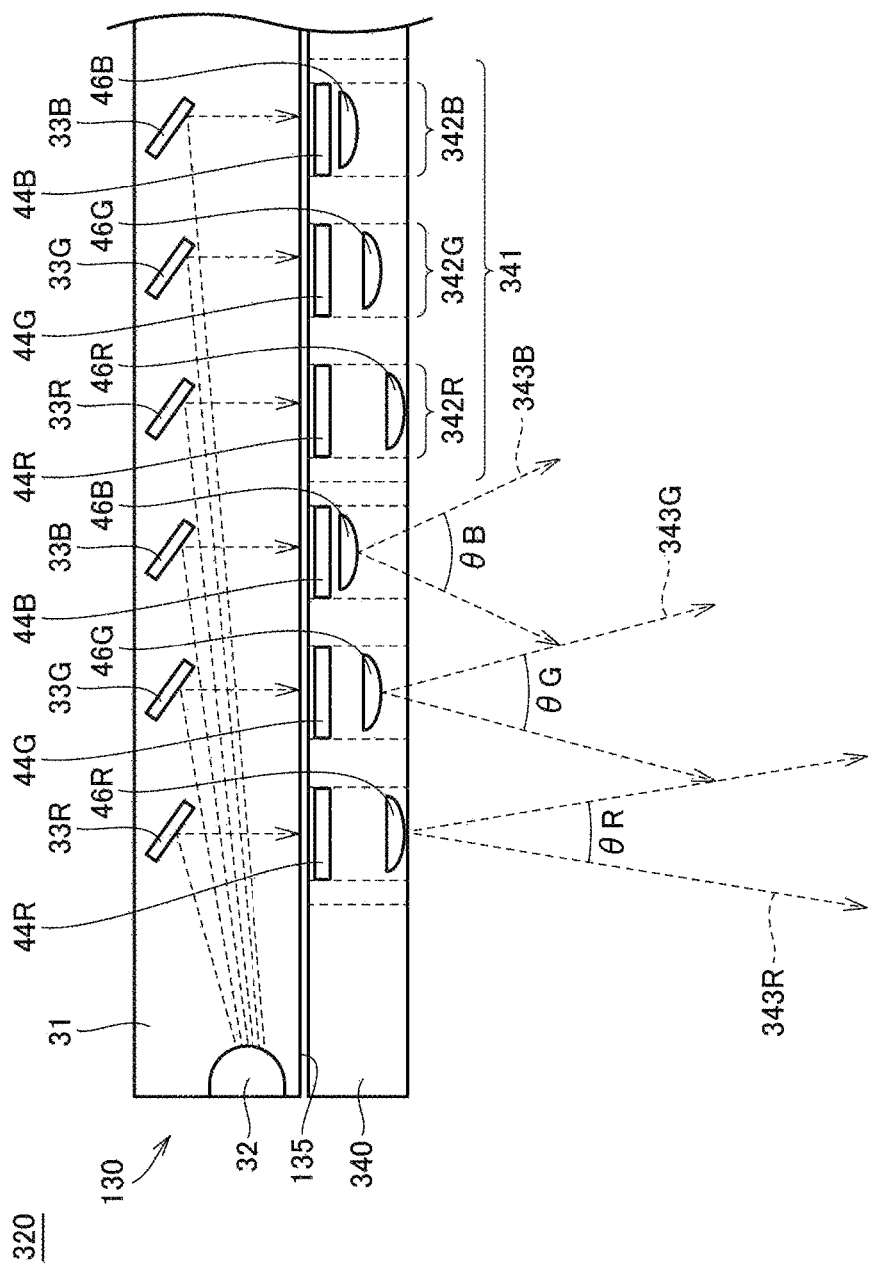
FIG. 11 is a schematic diagram illustrating a cross-section of an illumination device according to modification example 2.

FIG. 11 is a schematic diagram illustrating a cross-section of an illumination device 320 according to modification example 2. The illumination device 320 is different from the illumination device 120 illustrated in FIG. 7 in that the illumination device 320 includes a holder 340 in place of the holder 140.

The holder 340 is different from the holder 140 in that the holder 340 includes a set 341 including optical members 342R, 342G, and 342B in place of the set 141 including the optical members 142R, 142G, and 142B. The optical members 342R, 342G, and 342B are different from the optical members 142R, 142G, and 142B in that the optical members 342R, 342G, and 342B include lenses 46R, 46G, and 46B in place of the lenses 45R, 45G, and 45B, respectively.

The lenses 46R, 46G, and 46B are convex lenses having the same focal length. However, distances between the light emitting surface 135 of the surface light source 130 and the lenses 46R, 46G, and 46B are different from one another. In the example illustrated in FIG. 11, distances between the light emitting surface 135 and the lenses 46R, 46G, and 46B are set so that a solid angle θR of emitted light 343R from the lens 46R, a solid angle θG of emitted light 343G from the lens 46G, and a solid angle θB of emitted light 343B from the lens 46B satisfy θR<θG<θB. Accordingly, it is possible to make solid angles of emitted light 343R, 343G, and 343B from the lenses 46R, 46G, and 46B different from one another.

<G. Modification Example 3 of Configuration of Illumination Device>

Figure 12:
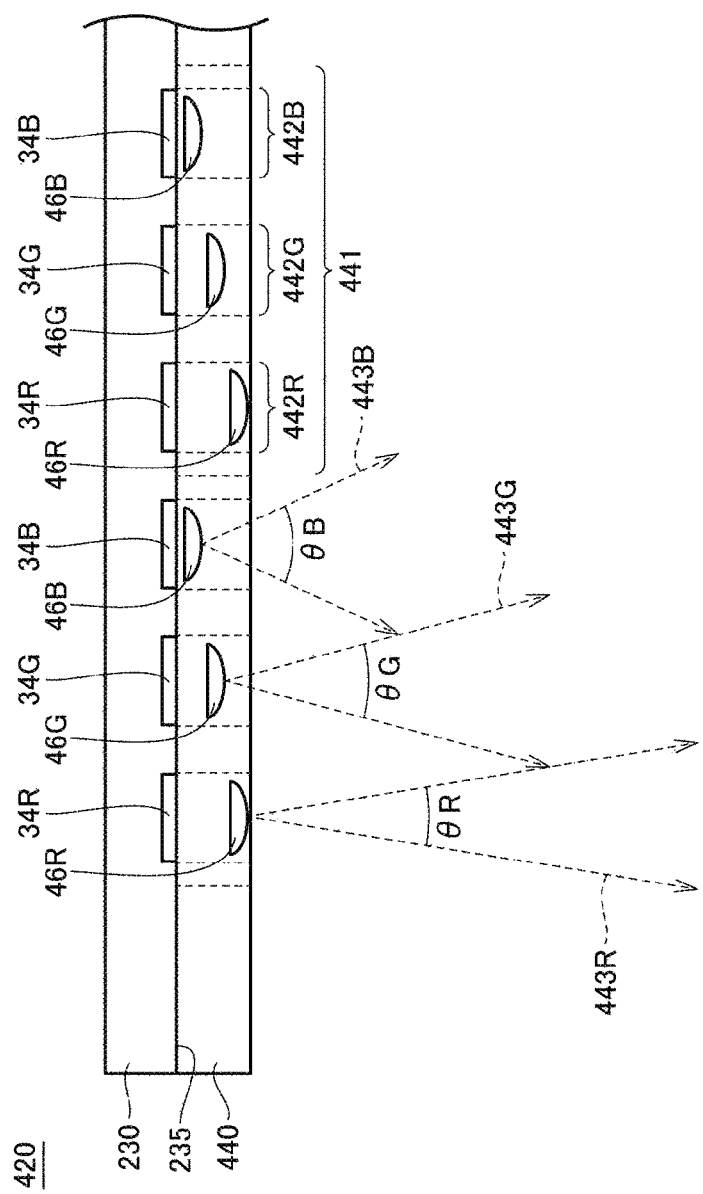
FIG. 12 is a schematic diagram illustrating a cross-section of an illumination device according to modification example 3.

FIG. 12 is a schematic diagram illustrating a cross-section of an illumination device 420 according to modification example 3. The illumination device 420 is different from the illumination device 220 illustrated in FIG. 9 in that the illumination device 420 includes a holder 440 in place of the holder 240.

The holder 440 is different from the holder 240 in that the holder 440 includes a set 441 including optical members 442R, 442G, and 442B in place of the set 241 including the optical members 242R, 242G, and 242B. The optical members 442R, 442G, and 442B are different from the optical members 242R, 242G, and 242B in that the optical members 442R, 442G, and 442B include lenses 46R, 46G, and 46B in place of the lenses 45R, 45G, and 45B, respectively.

Similarly to the modification example 2, distances between the light emitting surface 235 and the lenses 46R, 46G, and 46B are set so that a solid angle θR of emitted light 443R from the lens 46R, a solid angle θG of emitted light 443G from the lens 46G, and a solid angle θB of emitted light 443B from a lens 46B satisfy θR<θG<θB. Accordingly, it is possible to make the solid angles of the emitted light 443R, 443G, and 443B from the lenses 46R, 46G, and 46B different from one another.

<H. Modification Example 4 of Configuration of Illumination Device>

Figure 13:
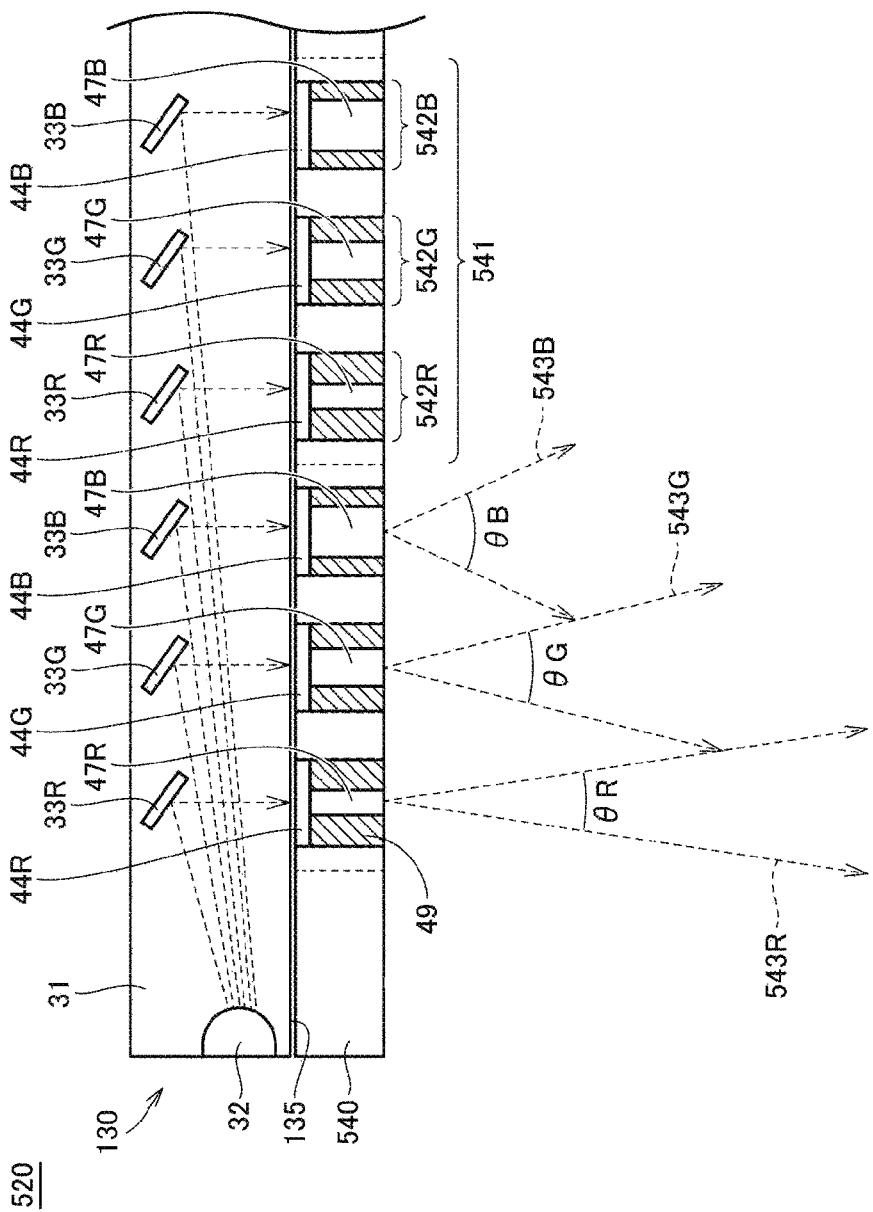
FIG. 13 is a schematic diagram illustrating a cross-section of an illumination device according to modification example 4.

FIG. 13 is a schematic diagram illustrating a cross-section of an illumination device 520 according to modification example 4. The illumination device 520 is different from the illumination device 120 illustrated in FIG. 7 in that the illumination device 520 includes a holder 540 in place of the holder 140.

The holder 540 is different from the holder 140 in that the holder 540 includes a set 541 including optical members 542R, 542G, and 542B in place of the set 141 including the optical members 142R, 142G, and 142B. The optical members 542R, 542G, and 542B are different from the optical members 142R, 142G, and 142B in that the optical members 542R, 542G, and 542B include light transmitting portions 47R, 47G, and 47B surrounded by light shielding walls 49 in place of the lenses 45R, 45G, and 45B.

The light transmitting portions 47R, 47G, and 47B are surrounded by a cylindrical light shielding wall 49 of which an axis is in a direction perpendicular to the light emitting surface 135. Cross-sectional areas of the light transmitting portions 47R, 47G, and 47B when the light transmitting portions 47R, 47G, and 47B are cut along a plane parallel to the light emitting surface 135 are different from one another. In the example illustrated in FIG. 13, the cross-sectional area of the light transmitting portion 47R is smaller than the cross-sectional area of the light transmitting portion 47G, and the cross-sectional area of the light transmitting portion 47G is smaller than the cross-sectional area of the light transmitting portion 47B. Accordingly, the solid angle θR of the emitted light 543R from the light transmitting portion 47R, the solid angle θG of the emitted light 543G from the light transmitting portion 47G, and the solid angle θB of the emitted light 543B from the light transmitting portion 47B satisfy θR<θG<θB. As a result, it is possible to make the solid angles of the emitted light 543R, 543G, and 543B from the optical members 542R, 542G, and 542B different from one another.

It should be noted that when the illumination device 520 includes the surface light source 230 (see FIG. 9) in place of the surface light source 130, the holder 540 may not include the filters 44R, 44G, and 44B. In this case, the light transmitting portions 47R, 47G, and 47B are disposed to face the light emitting portions 34R, 34G, and 34B of the surface light source 230, respectively.

<I. Other Modification Examples of Illumination Device>

In the above description, each of the respective sets 141, 241, 341, 441, and 541 included in the holders 140, 240, 340, 440, and 540 includes three optical members. However, each of the sets 141, 241, 341, 441, and 541 may include two optical members or may include four or more optical members. Wavelengths and solid angles of emitted light from n (n is an integer equal to or greater than 2) optical members included in each set are different from one another. Accordingly, it is possible to uniformize the solid angles of the light to be radiated to respective points of the workpiece W and to realize the image inspection device 1 that can be downsized.

<J. Appendix>

As described above, the embodiment and the modification examples include the following disclosure.

(Configuration 1)

An image inspection device (1) for inspecting a target (w) using a captured image, the image inspection device (1) including: a photographing portion (10) that images the target (w), and an illumination portion (20, 120, 220, 320, 420, or 520) disposed between the target (w) and the photographing portion (10), the illumination portion (20, 120, 220, 320, 420, or 520) includes a surface light source (30, 130, or 230), and a plurality of sets (41, 141, 241, 341, 441, or 541) including first to n-th optical members (42R, 42G, and 42B, 142R, 142G, and 142B, 242R, 242G, and 242B, 342R, 342G, and 342B, 442R, 442G, and 442B, or 542R, 542G, and 542B) arranged along a light emitting surface (35, 135, or 235) of the surface light source (30, 130, or 230), n is an integer equal to or greater than 2, the first to n-th optical members (42R, 42G, and 42B, 142R, 142G, 142B, 242R, 242G, and 242B, 342R, 342G, and 342B, 442R, 442G, and 442B, or 542R, 542G, and 542B) are disposed to face the light emitting surface (35, 135, or 235), and transmit the light emitted from the light emitting surface (35, 135, or 235) toward the target (w), and wavelengths and solid angles of light emitted from the first to n-th optical members (42R, 42G, and 42B, 142R, 142G, and 142B, 242R, 242G, and 242B, 342R, 342G, and 342B, 442R, 442G, and 442B, or 542R, 542G, and 542B) toward the target (w) are different from one another.

(Configuration 2)

The image inspection device (1) according to configuration 1, wherein the surface light source (130) emits white light, and the first to n-th optical members (42R, 42G, and 42B, 142R, 142G, and 142B, 342R, 342G, and 342B, or 542R, 542G, and 542B) include first to n-th filters (44R, 44G, and 44B) that transmit light having different wavelengths.

(Configuration 3)

The image inspection device (1) according to configuration 1, wherein the surface light source (230) includes first to n-th light emitting portions (34R, 34G, 34B) that radiate light having different wavelengths, and the first to the n-th light emitting parts (34R, 34G, 34B) are disposed to face the first to n-th optical members (242R, 242G, and 242B or 442R, 442G, and 442B), respectively.

(Configuration 4)

The image inspection device (1) according to any one of configurations 1 to 3, wherein the first to n-th optical members (142R, 142G, 142B or 242R, 242G, and 242B) include first to n-th lenses (45R, 45G, and 45B) having different focal lengths.

(Configuration 5)

The image inspection device (1) according to any one of configurations 1 to 3, wherein the first to n-th optical members (342R, 342G, and 342B or 442R, 442G, and 442B) include first to n-th lenses (46R, 46G, and 46B) having the same focal length, respectively, and the first to n-th lenses (46R, 46G, and 46B) have different distances from the light emitting surface (135 and 235).

(Configuration 6)

The image inspection device (1) according to any one of configurations 1 to 3, wherein the first to n-th optical members (542R, 542G, and 542B) include first to n-th light transmitting portions (47R, 47G, and 47B) surrounded by a cylindrical light shielding wall (49) of which an axis is in a thickness direction, and cross-sectional areas of the first through n-th light transmitting portions (47R, 47G, and 47B) when the first through n-th light transmitting portions (47R, 47G, and 47B) are cut along a plane parallel to the light emitting surface (135 or 235) are different from one another.

(Configuration 7)

The image inspection device (1) according to any one of configurations 1 to 6, wherein n is 3, and the light emitted from the first to third optical members (42R, 42G, and 42B, 142R, 142G, and 142B, 342R, 342G, and 342B, or 542R, 542G, and 542B) are red light, green light, and blue light, respectively.

(Configuration 8)

An illumination device (20, 120, 220, 320, 420, or 520) including the illumination portion according to any one of configurations 1 to 7.

According to this disclosure, since wavelengths and solid angles of the emitted light from the first to n-th optical members are different from one another, light reflected from the target and incident on the photographing portion has a wavelength according to a degree of inclination of the surface of the target. Therefore, it is possible to ascertain a degree of inclination of a local surface of the target by confirming the captured image.

Further, since the plurality of sets each including the first to n-th optical members are repeatedly arranged along the light emitting surface of the surface light source, the solid angles of the irradiation light at respective points on the surface of the target are substantially the same. Therefore, the photographing portion can image the respective points on the target under the same irradiation conditions. Accordingly, it is possible to accurately inspect a surface state of the target in an imaging range based on the captured image.

Further, sizes of the plurality of sets may be substantially the same as a field of view of the photographing portion. As a result, it is unnecessary to have a telecentric optical system having a size larger than the field of view of the photographing device unlike in the related art, and it is possible to downsize the image inspection device.

Accordingly, it is possible to uniformize the solid angles of the light to be radiated to respective points on the target and to realize an image inspection device that can be downsized.

In the above-described disclosure, the surface light source radiates white light. The first to n-th optical members include first to n-th filters transmitting light having different wavelengths, respectively.

According to this disclosure, it is possible to make wavelengths of emitted light from the first to n-th optical members different from one another with a simple configuration.

In the above-described disclosure, the surface light source includes first to n-th light emitting portions radiating different wavelengths of light. The first to n-th light emitting portions are arranged to face the first to n-th optical members, respectively.

According to this disclosure, it is possible to make wavelengths of emitted light from the first to n-th optical members different from one another with a simple configuration.

In the above-described disclosure, the first to n-th optical members include first to n-th lenses having different focal lengths, respectively.

According to this disclosure, it is possible to make solid angles of emitted light from the first to n-th optical members different from one another with a simple configuration.

In the above-described disclosure, the first to n-th optical members include first to n-th lenses having the same focal length, respectively. The first to n-th lenses have different distances from the light emitting surface.

According to this disclosure, it is possible to make solid angles of emitted light from the first to n-th optical members different from one another with a simple configuration.

In the above-described disclosure, the first to n-th optical members include first to n-th light transmitting portions surrounded by cylindrical light shielding walls of which an axis is in a direction perpendicular to the light emitting surface, respectively. Cross-sectional areas of the first through n-th light transmitting portions when the first through n-th light transmitting portions are cut along a plane parallel to the light emitting surface are different from one another.

According to this disclosure, it is possible to make solid angles of emitted light from the first to n-th optical members different from one another with a simple configuration.

In the above-described disclosure, n is 3, and the light emitted from the first to third optical members are red light, green light, and blue light, respectively.

According to this disclosure, in the captured image, a place having a surface parallel to the light emitting surface of the surface light source indicates a white color. A place having a slightly inclined surface indicates a color that is a combination of two colors of a red color, a green color, and a blue color. Further, a place having a further inclined surface indicates any one of the red color, the green color, and the blue color. Further, a place having a further inclined surface indicates a black color. Thus, the color of the captured image changes according to a degree of inclination of the surface of the target. As a result, it is possible to ascertain a degree of inclination of the surface of the target by confirming the color of the captured image.

According to this disclosure, it is possible to provide an illumination device capable of uniformizing an irradiation solid angle of light to be radiated to each point on a target and being downsized.

According to the disclosure, it is possible to provide an image inspection device and an illumination device capable of uniformizing an irradiation solid angle of light to be radiated to each point on a target and being downsized.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An image inspection device for inspecting a target using a captured image, the image inspection device comprising:
   a photographing portion that images the target, the photographing portion having a field of view that matches a size of the target; and
   an illumination portion disposed between the target and the photographing portion and comprising a holder,
   wherein the illumination portion comprises:
   a surface light source; and
   a plurality of sets, each set comprising first to n-th optical members arranged along a light emitting surface of the surface light source, wherein
   n is an integer equal to or greater than 2,
   the first to n-th optical members are disposed to face the light emitting surface, and transmit light emitted from the light emitting surface toward the target,
   the first to n-th optical members are configured to emit light toward the target with wavelengths and solid angles different from one another,
   the first and n-th optical members of the plurality of sets are repeatedly arranged in form of a rectangular matrix on the holder, and
   the holder and the photographing portion are configured such that a size of the holder is substantially the same as the field of view of the photographing portion, and a size of the plurality of sets is set to be equal to or smaller than a size of a region of the target indicated by one pixel in the captured image of the target from the photographing portion.

2. The image inspection device according to claim 1, wherein the surface light source radiates white light, and the first to n-th optical members comprise first to n-th filters transmitting light having different wavelengths, respectively.

3. The image inspection device according to claim 2, wherein the first to n-th optical members comprise first to n-th lenses having different focal lengths, respectively.

4. The image inspection device according to claim 2,
wherein the first to n-th optical members comprise first to n-th lenses having the same focal length, respectively, and the first to n-th lenses have different distances from the light emitting surface.

5. The image inspection device according to claim 2,
wherein the first to n-th optical members comprise first to n-th light transmitting portions surrounded by a cylindrical light shielding wall of which an axis is in a direction perpendicular to the light emitting surface, respectively, and cross-sectional areas of the first to n-th light transmitting portions when the first to n-th light transmitting portions are cut along a plane parallel to the light emitting surface are different from one another.

6. An illumination device comprising the illumination portion according to claim 2.

7. The image inspection device according to claim 2, wherein n is 3, and light emitted from the first to third optical members are red light, green light, and blue light, respectively, based on the different wavelengths of the light that are transmitted by the first to third filters, respectively.

8. An illumination device comprising the illumination portion according to claim 7.

9. The image inspection device according to claim 1,
wherein the surface light source comprises first to n-th light emitting portions radiating different wavelengths of light, and the first to n-th light emitting portions are arranged to face the first to n-th optical members, respectively.

10. The image inspection device according to claim 9, wherein the first to n-th optical members comprise first to n-th lenses having different focal lengths, respectively.

11. The image inspection device according to claim 9,
wherein the first to n-th optical members comprise first to n-th lenses having the same focal length, respectively, and the first to n-th lenses have different distances from the light emitting surface.

12. The image inspection device according to claim 9,
wherein the first to n-th optical members comprise first to n-th light transmitting portions surrounded by a cylindrical light shielding wall of which an axis is in a direction perpendicular to the light emitting surface, respectively, and cross-sectional areas of the first to n-th light transmitting portions when the first to n-th light transmitting portions are cut along a plane parallel to the light emitting surface are different from one another.

13. An illumination device comprising the illumination portion according to claim 9.

14. The image inspection device according to claim 1, wherein the first to n-th optical members comprise first to n-th lenses having different focal lengths, respectively.

15. An illumination device comprising the illumination portion according to claim 14.

16. The image inspection device according to claim 1,
wherein the first to n-th optical members comprise first to n-th lenses having the same focal length, respectively, and the first to n-th lenses have different distances from the light emitting surface.

17. An illumination device comprising the illumination portion according to claim 16.

18. The image inspection device according to claim 1,
wherein the first to n-th optical members comprise first to n-th light transmitting portions surrounded by a cylindrical light shielding wall of which an axis is in a direction perpendicular to the light emitting surface, respectively, and cross-sectional areas of the first to n-th light transmitting portions when the first to n-th light transmitting portions are cut along a plane parallel to the light emitting surface are different from one another.

19. An illumination device comprising the illumination portion according to claim 18.

20. An illumination device comprising the illumination portion according to claim 1.

* * * * *